United States Patent
Kumar et al.

(10) Patent No.: US 9,774,877 B2
(45) Date of Patent: Sep. 26, 2017

(54) DIGITAL WATERMARKING FOR SECURING REMOTE DISPLAY PROTOCOL OUTPUT

(71) Applicant: Dell Products L.P., Round Rock, TX (US)

(72) Inventors: Amit Kumar, Bangalore (IN); Mohammed Sarfraz, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 51 days.

(21) Appl. No.: 14/991,019

(22) Filed: Jan. 8, 2016

(65) Prior Publication Data
US 2017/0201763 A1    Jul. 13, 2017

(51) Int. Cl.
*G06K 9/00* (2006.01)
*H04N 19/467* (2014.01)
*G06T 1/00* (2006.01)
*G09G 5/00* (2006.01)

(52) U.S. Cl.
CPC .......... H04N 19/467 (2014.11); G06T 1/005 (2013.01); G09G 5/006 (2013.01); *G06T 2201/0051* (2013.01); *G06T 2201/0065* (2013.01); *G09G 2358/00* (2013.01); *G09G 2360/12* (2013.01)

(58) Field of Classification Search
USPC ....................................................... 382/100
See application file for complete search history.

(56) References Cited

U.S. PATENT DOCUMENTS

| | | | | |
|---|---|---|---|---|
| 7,039,708 | B1* | 5/2006 | Knobl | B60R 25/04 709/203 |
| 8,806,558 | B1* | 8/2014 | Cassidy | H04N 21/4627 382/235 |
| 2004/0184612 | A1* | 9/2004 | Kohiyama | G06T 1/0071 380/217 |
| 2011/0292077 | A1* | 12/2011 | Lapstun | H04N 1/00129 345/632 |
| 2012/0042275 | A1* | 2/2012 | Neerudu | G09G 5/14 715/781 |
| 2013/0097426 | A1* | 4/2013 | Agrawal | G06T 1/0021 713/176 |
| 2014/0196133 | A1* | 7/2014 | Shuster | H04L 63/126 726/7 |
| 2014/0368601 | A1* | 12/2014 | deCharms | H04W 4/021 348/14.02 |

* cited by examiner

*Primary Examiner* — Gregory F Cunningham
(74) *Attorney, Agent, or Firm* — Brian Tucker; Kirton McConkie (57) ABSTRACT

A digital watermark can be embedded within remote display protocol output. When host-side rendering is employed, the decoder on the client side can include a digital watermark component that can add a digital watermark to the remote display protocol output during the decoding process. This digital watermark can be specific to the end user and/or client device to thereby enable any misappropriation of the remote display protocol output to be traced back to the end user. The digital watermark can be added as a clearly visible portion of the remote display protocol output or can be added as an invisible (i.e., hidden) portion of the remote display protocol output.

21 Claims, 7 Drawing Sheets

DIGITAL WATERMARKING FOR SECURING REMOTE DISPLAY PROTOCOL OUTPUT

CROSS-REFERENCE TO RELATED APPLICATIONS

N/A

BACKGROUND

A remote display protocol is a protocol that can be used to allow the user interface of an application or desktop hosted on a server to be displayed on a client device. Similarly, a remote display protocol can be used to redirect user input on the client device to the server where the application or desktop is hosted thereby allowing the user of the client device to interact with the application or desktop.

One feature that is often provided with a remote display protocol is host-side rendering. Host-side rendering (also known as redirection) refers to an optimization technique where the server (i.e., the host of the application or desktop whose interface is being remoted) renders the content to be displayed (e.g., into bitmaps), encodes this content, and then transmits the encoded content to the client. The client can then decode the content and display it. Common examples of remote display protocols that provide host-side rendering include Microsoft's RemoteFX, Teradici's PC over IP, and Citrix Systems' HDX.

Host-side rendering can be employed with any type of client. However, it is especially beneficial with thin clients. For example, host-side rendering enables support for all graphics types by sending highly compressed bitmap images to the client in an adaptive manner. This also allows the applications to run at full speed on the server by taking advantage of the GPU and the CPU thereby providing an experience that is similar to a locally executed application or desktop.

BRIEF SUMMARY

The present invention extends to methods, systems, and computer program products for enabling the inclusion of a digital watermark in remote display protocol output. In particular, the present invention provides a way to add a digital watermark to content that is provided to a client using host-side rendering. The digital watermark can be added in a manner that is independent of the server thereby allowing the present invention to be implemented without requiring any changes to the server-side components of a remote display protocol implementation.

When host-side rendering is employed, the client includes a decoder for decoding the encoded content transmitted by the server. In accordance with embodiments of the present invention, the decoder can be modified to include a digital watermark component that can add a digital watermark to the remote display protocol output during the decoding process. In some embodiments, this digital watermark can be specific to the end user and/or client device to thereby enable any misappropriation of the remote display protocol output to be traced back to the end user. In some embodiments, the digital watermark can be added as a clearly visible portion of the remote display protocol output, whereas, in other embodiments, the digital watermark can be added as an invisible (i.e., hidden) portion of the remote display protocol output.

In one embodiment, the present invention is implemented as a method for embedding a watermark within remote display protocol output during decoding of the remote display protocol output. A remote display protocol connection can be established with a server. Encoded remote display protocol output can be received from the server over the remote display protocol connection. A watermark to be embedded within the remote display protocol output can be identified. During decoding of the remote display protocol output, pixel values of the remote display protocol output can be modified such that the remote display protocol output includes the watermark. The remote display protocol output can then be output with the watermark for display.

In another embodiment, the present invention is implemented as one or more computer storage media storing computer executable instructions which when executed implement a remote display protocol client that is configured to perform a method for embedding a watermark within remote display protocol output, the method comprising: receiving, over a remote display protocol connection, remote display protocol output that is encoded, the encoded remote display protocol output including data structures that each define pixel values for a corresponding area of a frame buffer; decoding the remote display protocol output including: monitoring the data structures to identify data structures pertaining to a particular area of the frame buffer, and modifying pixel values of at least some of the data structures pertaining to the particular area of the frame buffer, wherein the pixel values are modified in accordance with a watermark; and outputting the remote display protocol output with the modified pixel values for display.

In another embodiment, the present invention is implemented as a computing device that includes one or more processors and one or more computer storage media storing a remote display protocol client. The remote display protocol client, when executed by the one or more processors, implements a method for embedding a watermark in remote display protocol output. The method includes: establishing a remote display protocol connection with a server; receiving encoded remote display protocol output over the remote display protocol connection; while decoding the remote display protocol output, modifying one or more pixel values of the remote display protocol output so that a watermark appears in the remote display protocol output; and displaying the remote display protocol output with the watermark.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "remote display protocol output" should be construed as any type of content that is transferred from a server to a client using a remote display protocol for display at the client to the end user. The term "display" should encompass both visibly and audibly perceived content. In other words, remote display protocol output can encompass graphic content (e.g., a PowerPoint presentation), sound content, or both graphic and sound content (e.g., a movie) that is encoded by the server and transmitted to the client for decoding and display.

The present invention will be described with reference to Microsoft's RemoteFX. More particularly, the examples provided below will describe how the present invention can be implemented as part of a Remote Desktop Protocol ("RDP") client that includes a decoder configured to implement the RemoteFX enhancements of RDP. However, the present invention could equally be implemented as part of a client that is configured to communicate using other remote display protocols which include host-side rendering features including Citrix Systems' HDX and Teradici Corp's PCoIP among others.

Figure 1:
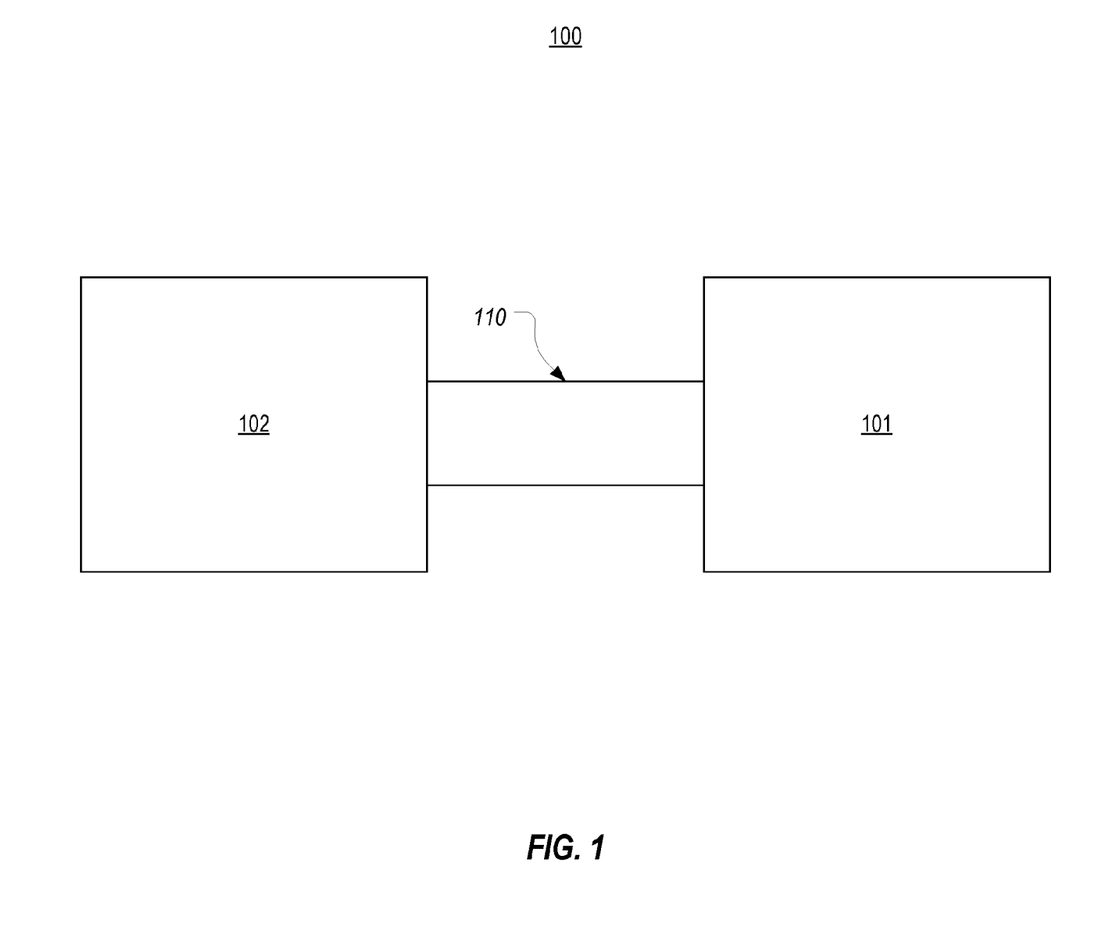
FIG. 1 illustrates an example computing environment in which the present invention can be implemented.

FIG. 1 illustrates an example computing environment 100 in which the present invention can be implemented. Computing environment 100 includes a server 101 and a client 102 that have established a channel 110 for communicating using a remote display protocol. Client 102 can represent any type of computing device that is configured to implement host-side rendering as part of a remote display protocol including desktop computers, laptop computers, thin clients, mobile devices, etc.

Figure 2:
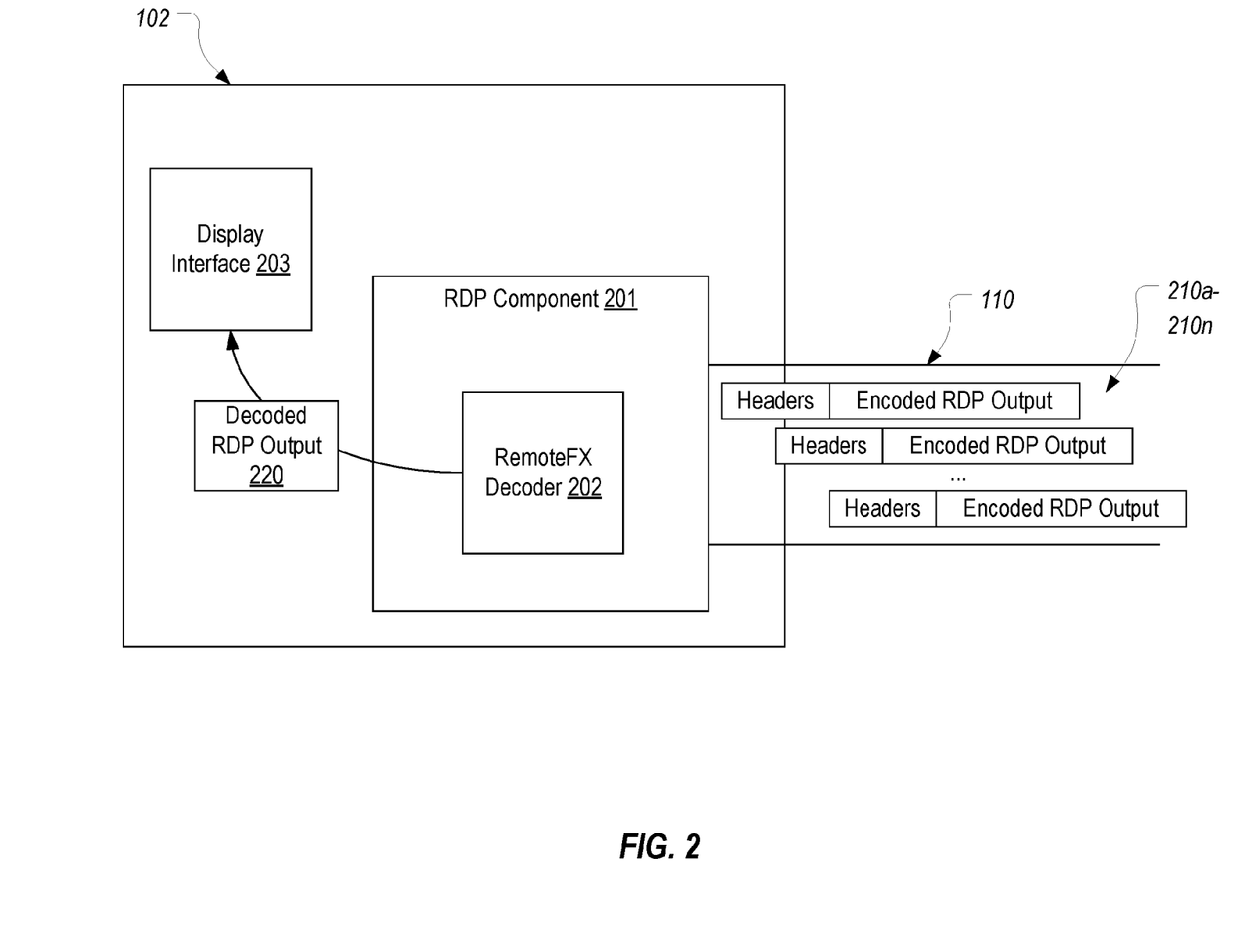
FIG. 2 illustrates an example of a remote display protocol component that includes a decoder for performing host-side rendering.

FIG. 2 illustrates various components that can be included on client 102 in accordance with one or more embodiments of the present invention. As shown, client 102 includes an RDP component 201 which is configured to implement the Remote Desktop Protocol in order to establish one or more channels (e.g., channel 110) with server 101. One of skill in the art understands the general functionality performed by RDP component 201 and therefore no additional description of this general functionality will be provided herein RDP client 201 includes a RemoteFX decoder 202. RemoteFX decoder 202 can generally represent the portions of RDP component 201 that are configured to decode encoded remote display protocol output that is transmitted over channel 110. For example, FIG. 2 depicts a number of packets 210a-210n that are transmitted over channel 110. Packets 210a-210n include appropriate headers as required by the Remote Desktop Protocol and a payload including encoded remote display protocol output. RDP component 201 can be configured to deliver the encoded remote display protocol output to RemoteFX decoder 202 for decoding. In some embodiments, RemoteFX decoder 202 can be an H.264 (or AVC) decoder; however, other decoders could also be used. Once RemoteFX decoder 202 has decoded the remote display protocol output, the decoded remote display protocol output 220 can be provided to display interface 203 so that the remote display protocol output is appropriately displayed by client 102.

Figure 3A:
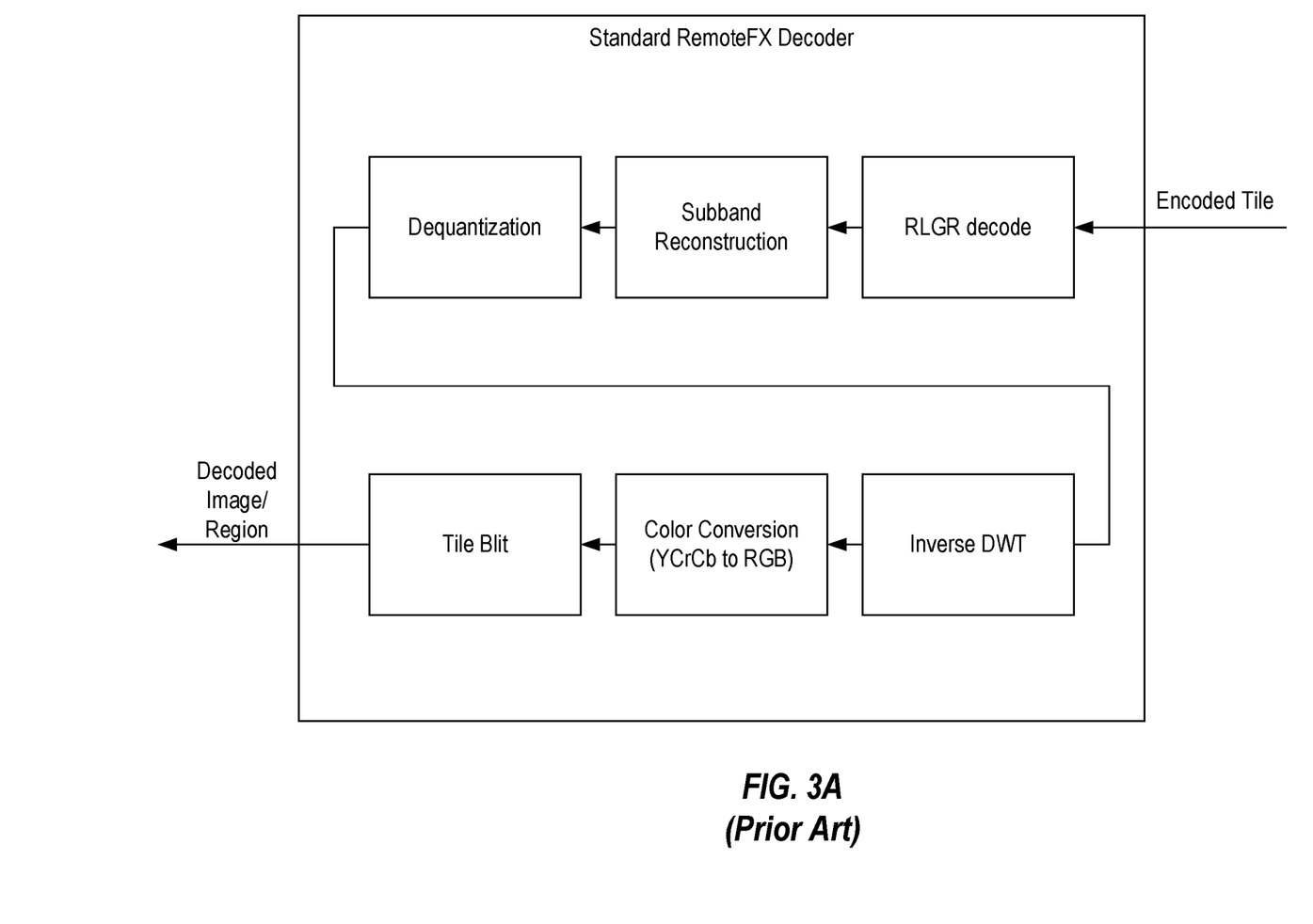
FIG. 3A illustrates the stages employed in a prior art version of a RemoteFX decoder.

FIG. 3A illustrates various steps that are performed by a standard RemoteFX decoder to decode the remote display protocol output. It is noted that these steps are generally the inverse of the steps performed by the corresponding encoder on the server. The RemoteFX codec is a tile-based transform codec. A tile is an arbitrary region contained within an image to be encoded. These tiles are generated on the server by overlaying an input image of the remote display protocol output with a tile grid. For example, if client 102 has a monitor having a display resolution of 1280×1024 pixels, server 101 can employ a frame buffer of the same size. Server 101 can overlay a tile grid on this frame buffer. As contents of the frame buffer are updated (i.e., as the application's user interface or the desktop change), server 101 can identify which portions of the frame buffer have been updated and also identify which tiles correspond to the updated portions. Tile data structures containing the pixel data for the updated portions can then be generated, encoded, and sent to the client. Each tile is independently processed. Accordingly, the client receives individual tile data structures that contain encoded remote display protocol output defining the values of the corresponding pixels that fall within the tile's area.

It is noted that the details of the decoding process are not essential to the present invention. In fact, the present invention can be implemented when different types of decoding processes are employed. For a detailed explanation of the RemoteFX decoding process, the reader can access [MS-RDPRFX]: Remote Desktop Protocol: RemoteFX Codec Extension, which was released on Oct. 16, 2015 and is available for download at: http://download.microsoft.com/download/9/5/E/95EF66AF-9026-4BB0-A41D-A4F81802D92C/[MS-RDPRFX].pdf. Of importance to the present invention is the fact that the decoding process is performed on individual tiles representing portions of an image to be displayed. Also, after the inverse DWT stage, the content for each tile will have been decoded into Y, Cb, and Cr components.

Figure 3B:
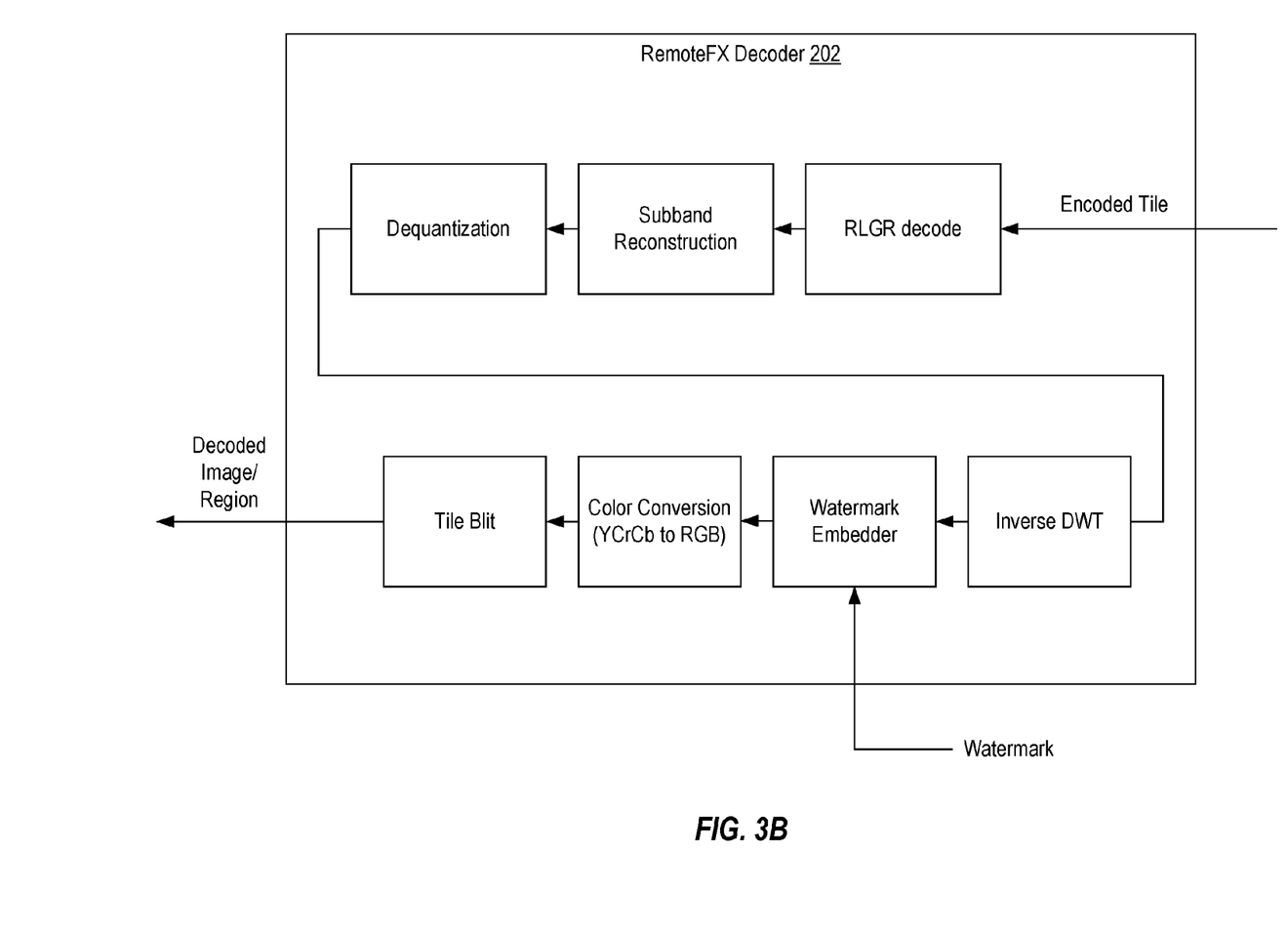
FIG. 3B illustrates the stages employed in a version of a RemoteFX decoder in accordance with one or more embodiments of the present invention.

FIG. 3B illustrates how RemoteFX decoder 202 can be configured to enable a digital watermark to be added during the decoding process. In addition to the stages shown in FIG. 3A, RemoteFX decoder 202 also includes a watermark embedder stage for embedding a watermark in the pixel data of appropriate tiles. In this context, embedding refers to modifying the Y, Cb, and/or Cr values of individual pixels so that a watermark will appear in the resulting image. Although FIG. 3B illustrates the watermark embedder stage being prior to the color conversion stage, it is also possible to implement the watermark embedder stage after the color conversion stage and prior to the tile blit stage. In other words, the watermark could be embedded by modifying the R, G, and/or B values of individual pixels as opposed to modifying the Y, Cr, and Cb values.

FIG. 3B shows that the watermark embedder stage includes the input of a watermark to be embedded in the image data. In some embodiments, this watermark can be dynamically obtained so that it provides an identifiable characteristic of the access to the remote display protocol output. For example, the watermark could be dynamically obtained based on the identity of the end user that is viewing the remote display protocol output (e.g., a username employed to access server 101), the MAC address, IP address, serial number, or other identifier of client 102, a timestamp, a logo or other identifier of the entity that is providing the remote display protocol output, etc.

By providing a dynamically determined watermark, the remote display protocol output can be secured more effectively. For example, if the remote display protocol output is a confidential PowerPoint presentation that should not be distributed publicly, the watermark embedder could be configured to dynamically obtain the username of the end user that is employing client 102 to access the PowerPoint presentation and embed the username in the PowerPoint presentation. Then, if the end user were to employ a camera to capture images or video of the PowerPoint presentation, the captured images or video would include the embedded watermark. If the end user then improperly shared this captured presentation, the presence of the watermark could be used to identify that the end user was the source of the improper distribution. The watermark can therefore serve as a deterrent to improper distribution of remote display protocol output that is viewed using RemoteFX or other remote display protocols that employ host-side rendering. Importantly, this deterrent effect can be accomplished independently of the encoding process on the server.

Figure 4:
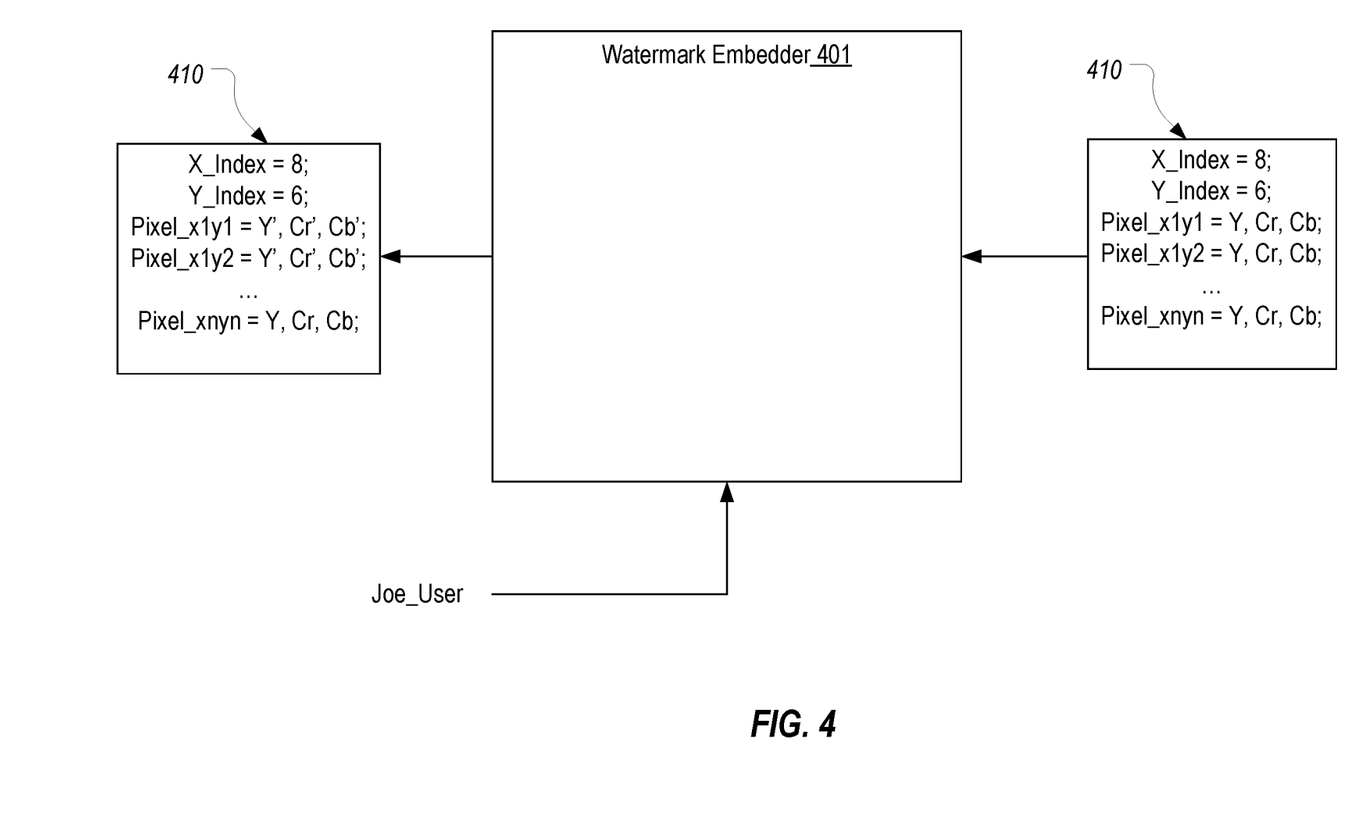
FIG. 4 illustrates an example of how a watermark embedder can modify pixel values during the decoding process to embed a watermark in the remote display protocol output.

FIG. 4 provides additional detail regarding how the watermark embedder (which will be referred to as watermark embedder 401) of RemoteFX decoder 202 can embed a watermark during the decoding process. Because watermark embedder 401 is operating before the tile blit stage of the decoding process (i.e., the stage where the contents of each individual tile is merged into the frame buffer to generate the frame to be output for display), watermark embedder 401 will receive individual tile data structures (e.g., TS_RFX_TILE structures) that each define the location of the tile in the tile grid. For example, as shown in FIG. 4, x and y index values can be included in tile data structure 410 to define where in the grid the tile falls. In this example, the x and y indexes are assigned values of 8 and 6 representing that tile data structure 410 pertains to the tile that is 8 spots to the right and 6 spots down from the top, left corner of the frame buffer. For purposes of this example, it will be assumed that tile(8, 6) encompasses the bottom right corner of the frame buffer (i.e., the pixels within tile(8, 6) will be displayed at the bottom, right corner of the screen). Tile data structure 410 also identifies Y, Cr, and Cb values for each pixel that it encompasses.

For simplicity, only a single tile data structure is depicted in FIG. 4. However, it should be understood that a stream of tile data structures will continuously be passed through the decoding process. As indicated above, server 101 can be configured to send a tile data structure for a particular tile when any of the pixels encompassed by that tile are updated. In this way, server 101 does not need to send data that has not changed.

Watermark embedder 401 can be configured to monitor the tile data structures as they are passed through the decoding process to identify tile data structures pertaining to the tile or tiles within which the watermark should be embedded. For example, in FIG. 4 it will be assumed that the watermark to be embedded is the end user's username "Joe_User" and that watermark embedder 401 is configured to embed this watermark in the bottom right corner of the display encompassed only by tile(8,6). In this case, watermark embedder 401 can monitor for any tile data structure that pertains to tile(8,6) (e.g., any tile data structure having an x index of 8 and a y index of 6), and modify the pixel data of such tile data structures such that the username "Joe_User" will appear in the resulting image/frame that is displayed. In FIG. 4, this modification is represented as the Y, Cr, and Cb values for Pixel_x1y1 and Pixel_x1y2 being changed to Y', Cr', and Cb'. Of course, this is a simplified example since embedding "Joe_User" would require modifying the values of more than two pixels.

To ensure that the watermark remains in the display, watermark embedder 401 can be configured to identify each tile data structure for tile(8,6) and modify its pixel values to include the watermark. In this way, any time there is an update to the area of the screen encompassed by tile(8,6), watermark embedder 401 will intercept the tile data structure containing the updated pixel values and modify the updated pixel values to include the watermark. This would result in the watermark being displayed continuously. However, in other embodiments, it may be desirable to only periodically display the watermark. In such cases, watermark embedder 401 could be configured to modify the pixel values of tile data structures pertaining to tile(8,6) according to some interval such as, for example, every nth tile data structure pertaining to tile(8,6), the first tile data structure pertaining to tile(8,6) that is received after a specified amount of time has elapsed since the last time a watermark was added, etc.

The above described example has assumed that the watermark will consistently appear in the same location of the display (e.g., the bottom right corner). In some embodiments, however, watermark embedder 401 may be configured to modify where the watermark is embedded. For example, watermark embedder 401 may embed the watermark in the bottom right corner for a first amount of time and then embed the watermark in the top left corner for a second amount of time. Alternatively, watermark embedder 401 could be configured to position the watermark based on the pixel values of the frame. For example, watermark embedder 401 could identify an "empty" area of the display (e.g., by detecting an area (whether encompassed by a single or multiple tiles) where the pixels are assigned the same or similar color) and can position the watermark within this area. In this way, watermark embedder 401 could intelligently embed the watermark so as to not cover up an important part of the remote display protocol output.

In the above example, a username of the end user is embedded as a watermark. This is an example of a visible watermark. Other types of visible watermarks include any text-based watermark (e.g., a MAC Address, IP address, company name, etc.) or a logo (e.g., of the company that owns or is providing the remote display protocol output). Alternatively, watermark embedder 401 could be configured to embed an "invisible" watermark. An invisible watermark refers to any watermark that is embedded in a way that it will not be readily visible or that if visible has no apparent meaning. In such cases, the process of embedding the watermark can be carried out in a similar manner by detecting the appropriate tiles and modifying their pixel values accordingly. In particular, watermark embedder 401 could create a known or dynamically determined pattern of pixel values within the display (whether encompassed by a single tile or multiple tiles) that would only be readily detectable by a device or an individual that knows the pattern. For example, watermark embedder 401 could create a pattern of white pixels where the pattern uniquely identifies the end user or a characteristic of client 102.

In some embodiments, a watermark may additionally or alternatively be embedded within an audio portion of the remote display protocol output. In such cases, a watermark embedder (not shown) could be positioned along the audio decode path of the RemoteFX decoder (or similar H.264 decoder) to allow the watermark embedder to inject an audio watermark at appropriate times. These audio watermarks could be perceptible watermarks (i.e., a sound that can easily be perceived such as a copyright notice or warning against improper distribution) or an imperceptible watermark (e.g., a tone that is outside the human range of hearing or a sound that is perceptible but would appear meaningless). The watermark embedder could monitor the decoding of the remote display protocol output and output the audio watermark periodically (in the case of a perceptible or imperceptible watermark) or continuously (in the case of an imperceptible watermark).

Figure 5:
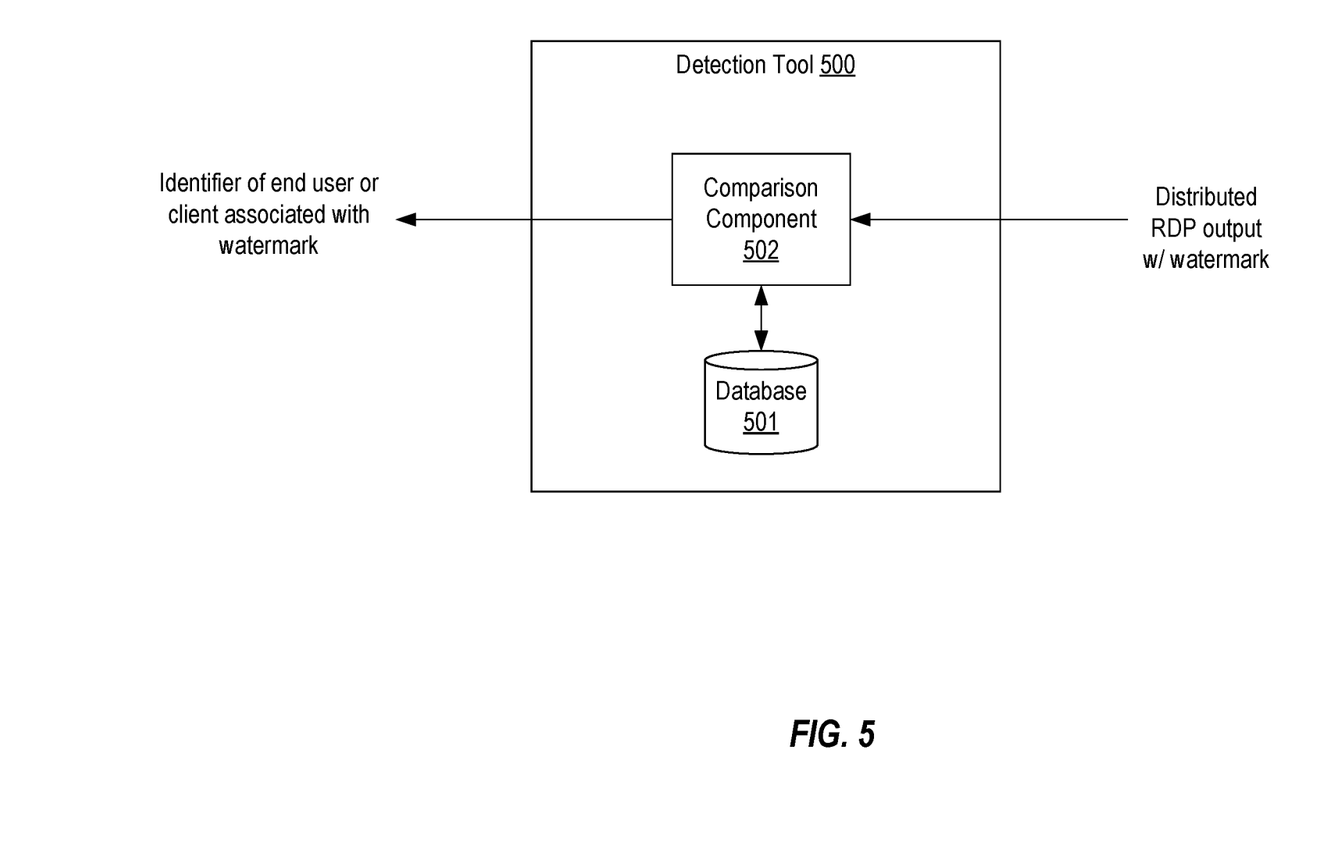
FIG. 5 illustrates an example of a detection tool that can be configured to detect the presence of a watermark within remote display protocol output that has been improperly distributed.

In addition to providing a watermark embedder within the decoder, the present invention can also include the provision of components for detecting the presence of a watermark in distributed remote display protocol output. For example, FIG. 5 illustrates a detection tool 500 that includes a database 501 of known watermarks and a comparison component 502. Detection tool 500 can primarily be used in cases where the watermark embedded in the remote display protocol output does not immediately identify the likely source of the improper distribution. For example, detection tool 500 can primarily be used in cases where an invisible watermark is employed.

Database 501 can store mappings between watermarks that have been embedded in remote display protocol output and identifiers of end users or clients to which the remote display protocol output was provided. RDP component 201 could be configured to communicate with a server on which detection tool 500 is executed to assist in creating entries in database 501. For example, any time watermark embedder 401 embeds a watermark in remote display protocol output, RDP component 201 could be configured to send a mapping between the watermark and the end user and/or client 102 for storage in database 501.

Then, whenever it is determined that remote display protocol output has been improperly distributed, the remote display protocol output can be provided to comparison component 502. Comparison component 502 can be configured to process the remote display protocol output to extract the watermark (e.g., to identify an invisible pattern) and then compare the watermark with the mappings stored in database 501. When a match is identified, comparison component 502 can output an identifier of the end user and/or client to which the watermark is mapped. In this way, an entity can identify the likely source of improperly distributed remote display protocol output and can take appropriate action to prevent any further improper distribution.

Figure 6:
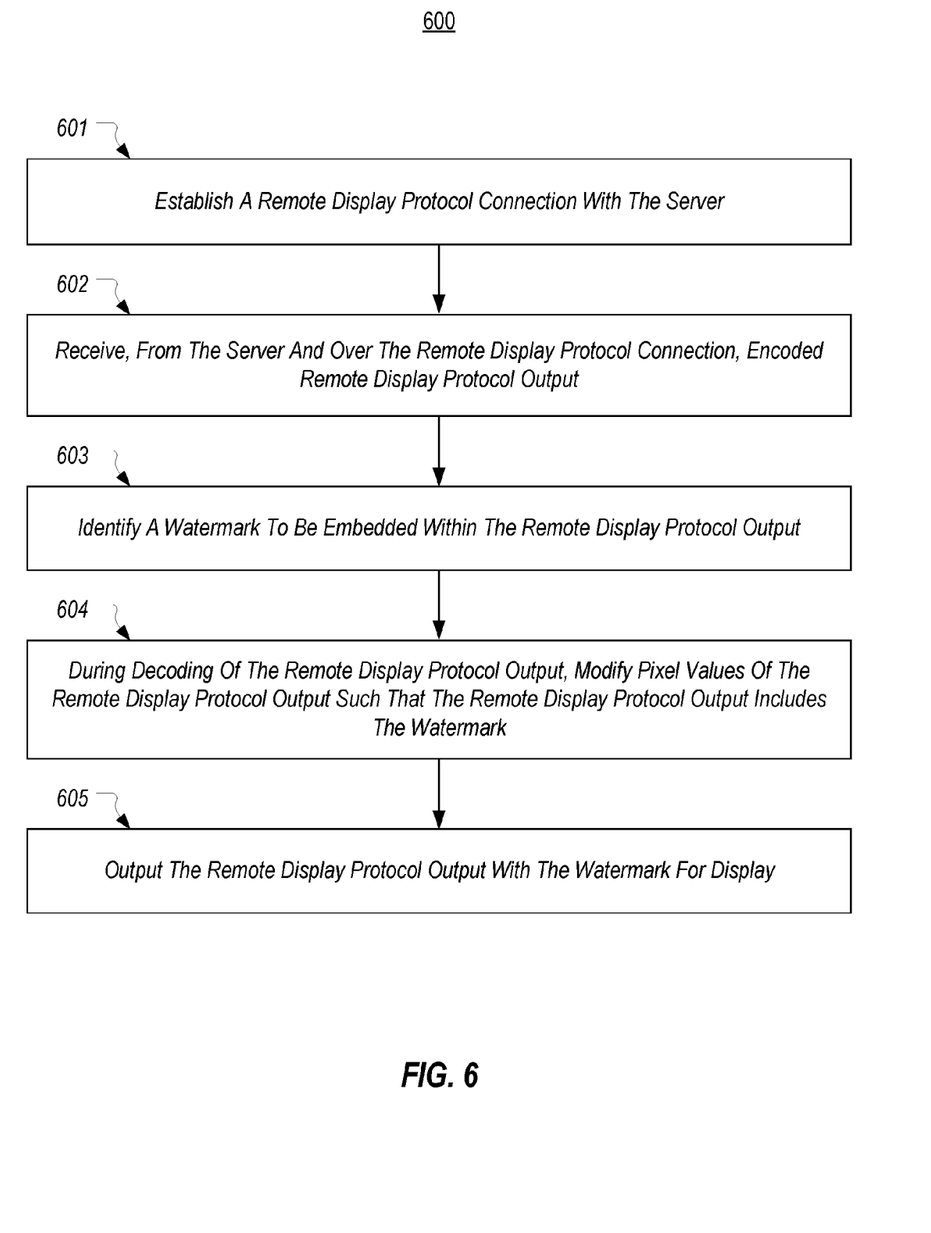
FIG. 6 illustrates a flowchart of an example method for embedding a watermark within remote display protocol output during decoding of the remote display protocol output.

FIG. 6 provides a flowchart of an example method 600 for embedding a watermark within remote display protocol output during decoding of the remote display protocol output. Method 600 can be performed by any computing device that includes a remote display protocol component having a decoder for decoding remote display protocol output that was received from a server using a remote display protocol.

Method 600 includes an act 601 of establishing a remote display protocol connection with the server. For example, RDP component 201 can establish connection 110 with an appropriate remote display protocol component executing on server 101.

Method 600 includes an act 602 of receiving, from the server and over the remote display protocol connection, encoded remote display protocol output. For example, packets 210a-210n containing encoded remote display protocol output can be received by RDP component 201.

Method 600 includes an act 603 of identifying a watermark to be embedded within the remote display protocol output. For example, RemoteFX Decoder 202 can identify a username used to create connection 110, a MAC or IP address of client device 102, an identifier of an entity that provides the encoded RDP output, etc.

Method 600 includes an act 604 of, during decoding of the remote display protocol output, modifying pixel values of the remote display protocol output such that the remote display protocol output includes the watermark. For example, RemoteFX Decoder 202 can include watermark embedder 401 that modifies pixel values of the remote display protocol output so that a visible or invisible watermark appears in the remote display protocol output when displayed.

Method 600 includes an act 605 of outputting the remote display protocol output with the watermark for display. For example, RemoteFX Decoder 202 can output decoded RDP output 220 that includes modified pixel values to display interface 203.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed is:

1. A method, implemented by a remote display protocol client that employs a remote display protocol to receive remote display protocol output from a server, for embedding a watermark within the remote display protocol output during decoding of the remote display protocol output, the method comprising:
    establishing a remote display protocol connection with the server;
    receiving, from the server and over the remote display protocol connection, encoded remote display protocol output;
    identifying a watermark to be embedded within the remote display protocol output;
    during decoding of the remote display protocol output, modifying pixel values of the remote display protocol output such that the remote display protocol output includes the watermark; and
    outputting the remote display protocol output with the watermark for display.

2. The method of claim 1, wherein the remote display protocol output is encoded in accordance with an H.264 encoder.

3. The method of claim 2, wherein the encoded remote display protocol output comprises tile data structures.

4. The method of claim 3, wherein decoding comprises identifying tile data structures pertaining to a particular location of the display, and wherein modifying pixel values of the remote display protocol output comprises modifying pixel values within tile data structures pertaining to the particular location.

5. The method of claim 4, wherein the pixel values of each tile data structure pertaining to the particular location are modified so that the watermark continuously appears in the display.

6. The method of claim 4, wherein the pixel values of selective tile data structures pertaining to the particular location are modified so that the watermark does not appear continuously in the displayed remote display protocol output.

7. The method of claim 4, wherein the particular location is updated during the decoding of the remote display protocol output such that the relative location of the watermark within the displayed remote display protocol output changes.

8. The method of claim 1, wherein identifying the watermark comprises identifying an identifier of an end user of the remote display protocol client.

9. The method of claim 8, wherein the identifier of the end user is a username employed to establish the remote display protocol connection.

10. The method of claim 1, wherein identifying the watermark comprises an identifier of an entity that provides the remote display protocol output.

11. The method of claim 1, further comprising:
    maintaining a database that maps the watermark to an end user.

12. One or more computer storage media storing computer executable instructions which when executed implement a remote display protocol client that is configured to perform a method for embedding a watermark within remote display protocol output, the method comprising:
    receiving, over a remote display protocol connection, remote display protocol output that is encoded, the encoded remote display protocol output including data structures that each define pixel values for a corresponding area of a frame buffer;
    decoding the remote display protocol output including:
        monitoring the data structures to identify data structures pertaining to a particular area of the frame buffer, and
        modifying pixel values of at least some of the data structures pertaining to the particular area of the frame buffer, wherein the pixel values are modified in accordance with a watermark; and
    outputting the remote display protocol output with the modified pixel values for display.

13. The computer storage media of claim 12, wherein the data structures comprise tile data structures of an H.264 codec.

14. The computer storage media of claim 12, further comprising:
    identifying the watermark to be used in modifying the pixel values.

15. The computer storage media of claim 14, wherein identifying the watermark comprises determining an identifier of an end user of the remote display protocol client.

16. The computer storage media of claim 14, wherein identifying the watermark comprises determining an identifier of a computing device on which the remote display protocol client is executed.

17. The computer storage media of claim 12, wherein the watermark is one of a visible watermark or an invisible watermark.

18. A computing device comprising:
    one or more processors; and
    one or more computer storage media storing a remote display protocol client, wherein the remote display protocol client, when executed by the one or more processors, implements a method for embedding a watermark in remote display protocol output, the method comprising:
        establishing a remote display protocol connection with a server;
        receiving encoded remote display protocol output over the remote display protocol connection;
        while decoding the remote display protocol output, modifying one or more pixel values of the remote display protocol output so that a watermark appears in the remote display protocol output; and
        displaying the remote display protocol output with the watermark.

19. The computing device of claim 18, wherein the remote display protocol output is encoded as a number of tile data structures in accordance with an H.264 codec, each tile data structure containing pixel values for a corresponding area of a frame buffer, and wherein modifying one or more pixel values of the remote display protocol output comprises identifying tile data structures encompassing a particular area of the frame buffer and modifying one or more pixel values within the tile data structures encompassing the particular area of the frame buffer.

20. The computing device of claim 18, wherein the watermark comprises:
    an identifier of an end user of the remote display protocol client;
    an identifier of the computing device; or an identifier of an entity that provides the remote display protocol output.

21. The method of claim 1, wherein identifying the watermark comprises identifying a characteristic of a computing device on which the remote display protocol client is executed.

\* \* \* \* \*